(No Model.) 2 Sheets—Sheet 1.

P. MEYER & W. SCHRAGE.
FODDER CUTTER.

No. 406,660. Patented July 9, 1889.

WITNESSES:
Donn Twitchell
C. Sedgwick

INVENTOR:
P. Meyer
W. Schrage
BY Munn & Co
ATTORNEYS.

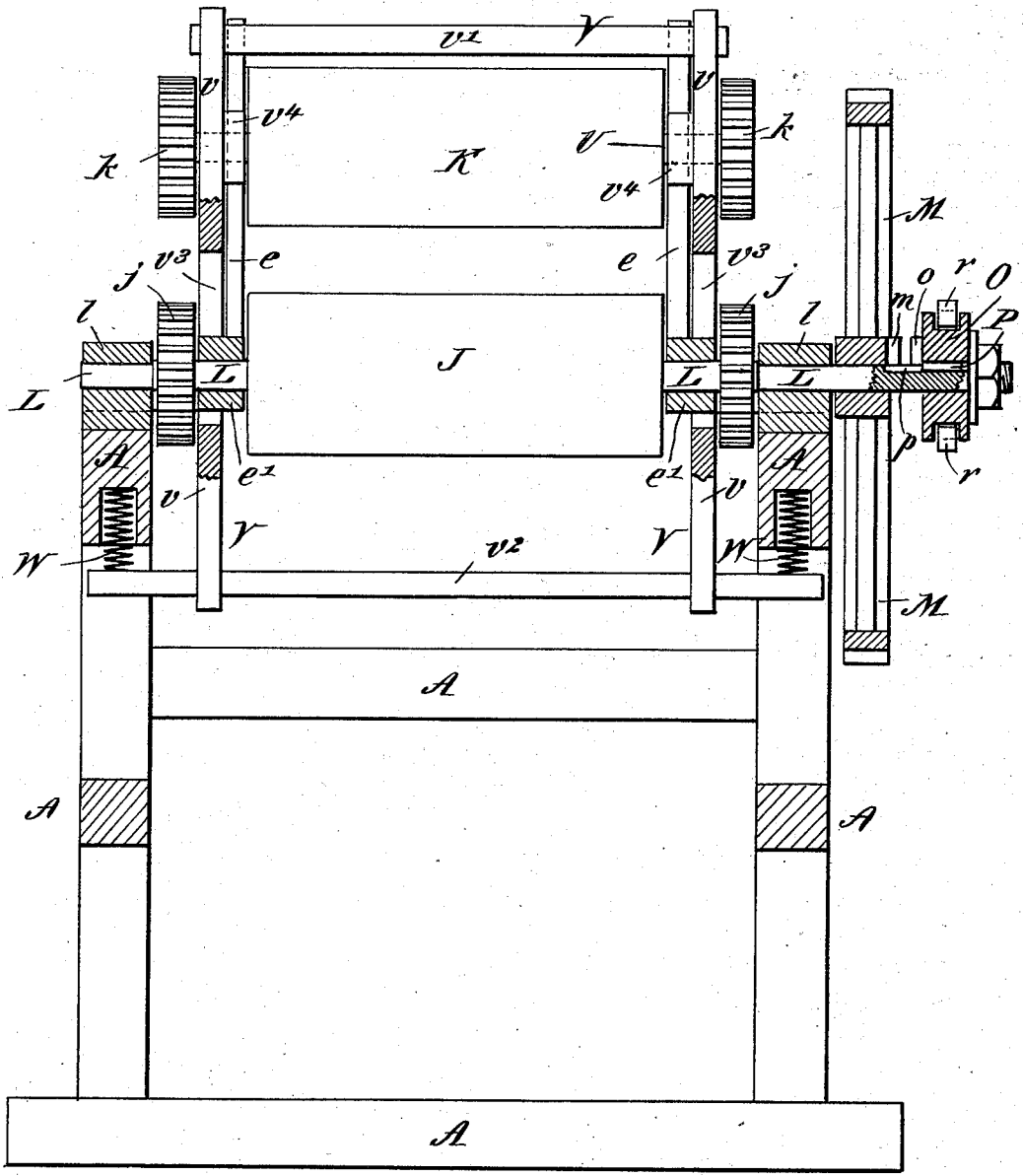

UNITED STATES PATENT OFFICE.

PHILIP MEYER AND WILLIAM SCHRAGE, OF SHEBOYGAN, WISCONSIN.

FODDER-CUTTER.

SPECIFICATION forming part of Letters Patent No. 406,660, dated July 9, 1889.

Application filed November 6, 1888. Serial No. 290,074. (No model.)

*To all whom it may concern:*

Be it known that we, PHILIP MEYER and WILLIAM SCHRAGE, of Sheboygan, in the county of Sheboygan and State of Wisconsin, have invented a new and Improved Fodder-Cutter, of which the following is a full, clear, and exact description.

Our invention relates to a machine adapted more especially for cutting hay, straw, cornstalks, or other substance to make fodder for stock; and the invention has for its object to provide a simple, inexpensive, and efficient cutter of this class which may be readily adjusted to throw its feed roll or rolls into and out of gear at the will of the operator, to avoid accidents and to give the cutter-head a chance to clear itself, or to allow feeding of material to it by hand, if desired.

The invention consists in the construction and arrangement of parts hereinafter described and claimed.

Reference is to be had to the accompanying drawings, forming a part of this specification, in which similar letters of reference indicate corresponding parts in all the figures.

Figure 1:
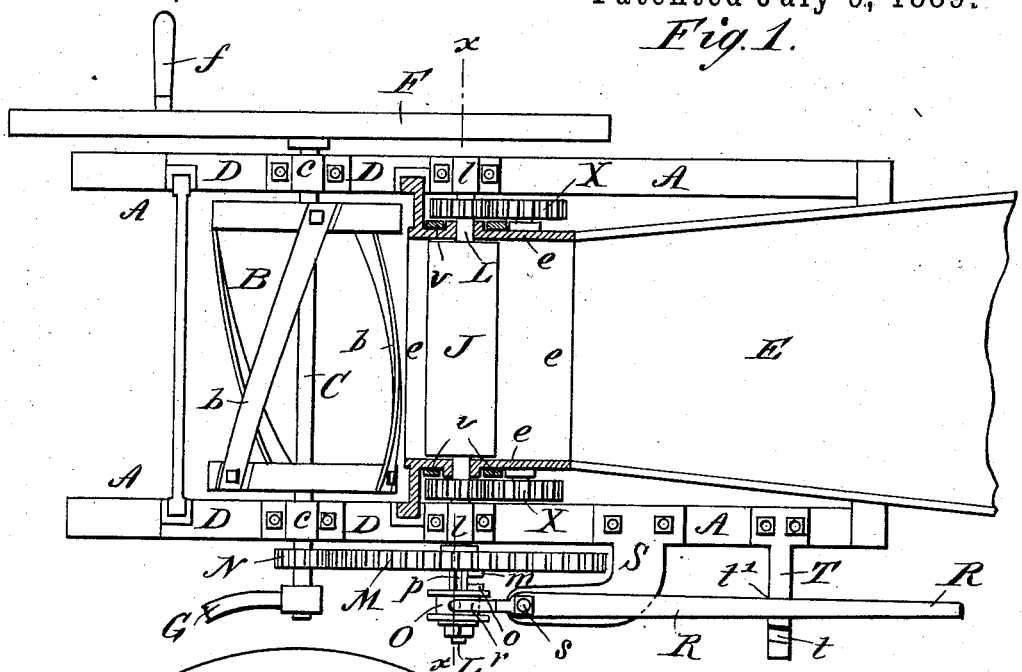
Figure 2:
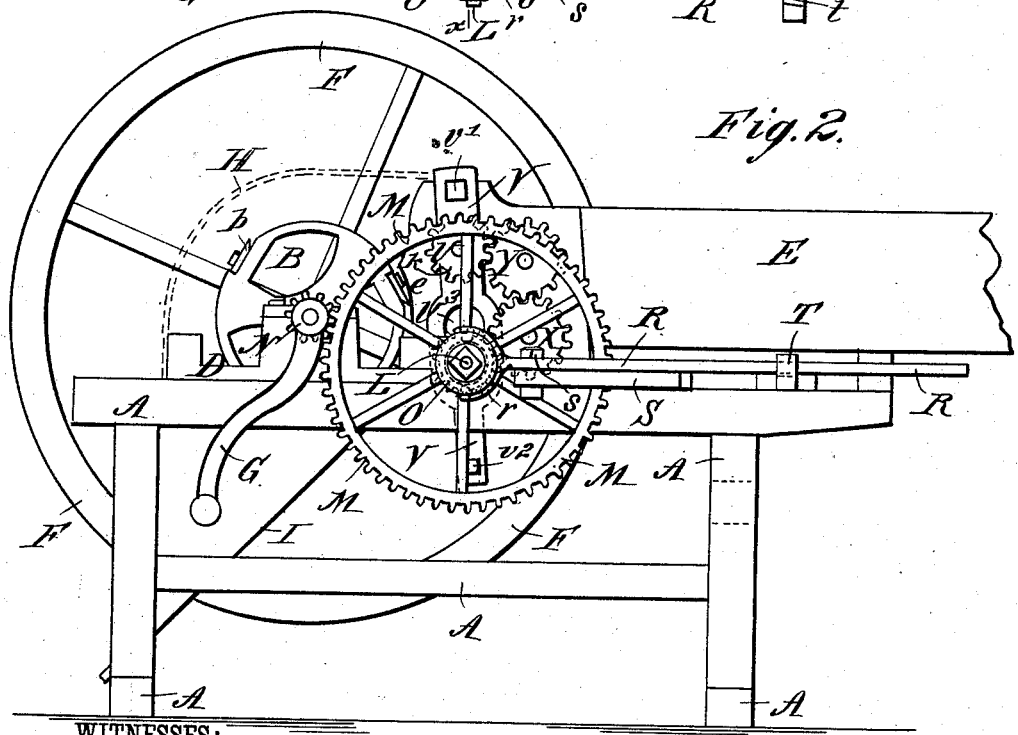

Figure 1 is a sectional plan view of our improved cutter with parts removed and other parts broken away. Fig. 2 is a side elevation of the machine, and Fig. 3 is an enlarged vertical transverse section taken on the line $x\ x$ in Fig. 1.

The machine-frame A may have any suitable construction to support the working parts. The cutter-head B is fixed to a transverse shaft C, which is journaled in fixed boxes $c\ c$ on a metallic bed-plate D, which is fastened to the frame A and gives substantial support to the metallic front end portion $e$ of the hopper E, which is made principally of wood in the usual manner, and is sustained at its rear end on the main frame. The cutter-head B is preferably provided with bent or curved diagonal knives $b$, which work close to the metal head $e$ of the hopper or a throat thereat to cut straw or hay fodder or other substance fed along the hopper. The cutter-head shaft is provided at one end with a balance-wheel F, having a handle $f$, by which it may be turned, and at its other end the shaft has a crank G, to which power for operating the cutter-head may also be applied. The cutter-head is covered by a hood or cap H, which is shown in dotted lines in Fig. 2 of the drawings, and prevents scattering of the cut material, which falls onto an inclined board or apron I, which delivers it in a compact pile at the front of the machine or into a tub or vessel arranged to receive it. All the above-described parts may have any ordinary or approved construction.

The automatic feeding devices, to which our invention particularly relates, we describe as follows: The lower feed-roll J, with which the upper feed-roll K co-operates, is fixed to a shaft L, which is journaled in boxes $l\ l$, fixed to the main frame A, and is journaled also in lugs $e'\ e'$ on the metal head $e$ of the hopper. This shaft L carries loosely a large spur gear-wheel M, which is normally engaged by a pinion N, fast on the cutter-head shaft. The loosely-mounted gear-wheel M is provided at its hub with a lug $m$, forming a half-clutch adapted to be engaged by a lug $o$ on the inner side of a clutch O, which is splined to the lower feed-roll shaft L, and preferably by a key or feather P on the clutch entering a slot $p$ in the shaft; but the feather may be on the shaft and the slot in the clutch, as preferred. The clutch O is engaged by the forked head or forward end $r$ of a shipping-lever R, which is fulcrumed at $s$ to a metal plate or arm S, fastened to the machine. The rear end of the lever extends over an arm T, which is also held to the frame, and is provided with a couple of slots $t\ t'$, into which the lever may be placed or caught to hold the lug $o$ of clutch O engaged with or disengaged from the clutch-lug $m$ on the gear-wheel M, as hereinafter more fully explained.

The upper feed-roll K is journaled by its shaft U in opposite side bars $v\ v$ of a frame or shears V, said side bars being connected by an upper cross-bar $v'$ and an elongated lower cross-bar $v^2$, and between the ends of this bar $v^2$ and opposite side bars of the frame A, and preferably within sockets or recesses of the bars, are placed springs W W, which, by their normal expansion hold or press the frame V and the upper feed-roll K downward onto a greater or less body of material being passed between the feed-rolls from the hopper to the cutter-head. Weights may be hung or held to the frame V as the full mechanical equivalents of the springs. The side bars $v\,v$ of the frame V are provided with vertically-ranging slots $v^3\,v^3$, into which the lugs $e'\,e'$ of the hopper-head $e$ enter, and the frame-bars $v$ are also preferably provided with inwardly-projecting lugs $v^4\,v^4$, which move along the hopper-head, and with the lugs and slots $e'\,v^3$ constitute guides to the roller-frame or shears during its vertical movements, to accommodate thicker or thinner masses or layers of material passing between the feed-rolls.

The shaft L of the lower or bed feed-roll J is provided with a pair of fixed gear wheels or pinions $j\,j$, one at each side of the machine, and these gear-wheels are engaged by a pair of idler gear wheels X X, which in turn engage an upper pair of idler-gears Y Y, which engage the gear wheels or pinions $k\,k$, which are fast on opposite ends of the shaft of the upper feed-roll K, and whereby as the lower feed-roll is turned over outward by the clutched wheel M the upper feed-roll will be rotated in the reverse direction to carry or force the material between them to the cutter-head. The idler-gears X and Y are journaled to or on stub-axles held to the metal head $e$ of the hopper.

The operation of the feed-roll mechanism is very simple and effective, as follows: When the cutter-head is rotated by power or by one or more persons grasping the wheel and crank F G, and when the shipping-lever R is engaged with the notch $t'$ of the arm T, to hold the clutch O disengaged from the clutch-lug $m$ of the gear-wheel M, this wheel will simply be turned on the lower feed-roll shaft L without effect on the feeding mechanism; but should the lever R be shifted and caught into the notch $t$ of the arm T the lug $o$ of clutch O will be engaged with the lug $m$ of the gear-wheel M, and the lower feed-roll shaft will thus be rotated, and will by its gear-wheels, the idler-gears, and the gear-wheels of the upper feed-roll rotate the latter also to feed hay, straw, cornstalks, or other substance to the cutter-head. If at any time the feeding should be too fast, so as to choke or partially choke the cutter-head, it is only necessary for the operator to shift the lever R back into the notch $t'$, and thereby unclutch the parts O M, which will allow the cutter-head to be operated without actuating the feed-rolls, or, in other words, the feeding will stop, while the cutting may be proceeded with until the cutter-head clears itself, or to allow the feeding of material to the cutter-head by hand, as may at times be desirable. Hence it follows that the operator has complete and easy control of the machine, so as to prevent accidents and assure maximum efficiency with the least expenditure of power.

Having thus described our invention, what we claim as new, and desire to secure by Letters Patent, is—

In a fodder-cutter, the combination, with a frame, of a main driving-shaft journaled within the same, a cutter-head mounted upon the driving-shaft, a pinion secured upon the end of the driving-shaft, the upper and lower feed-rolls, the upper roller being mounted in the vertically-adjustable frame V, the driving-wheel M, loosely mounted upon the lower feed-roll shaft and meshing with the pinion N, the clutch O for operating the said wheel, the lever R, gears $j$ and $k$, idlers X and Y, for operating the upper feed-roll, and means for operating the main driving-shaft, substantially as shown and described.

PHILIP MEYER.
WILLIAM SCHRAGE.

Witnesses:
F. RAAB,
OTTO FEESLE.